United States Patent [19]

Larew

[11] Patent Number: 4,530,179
[45] Date of Patent: Jul. 23, 1985

[54] SALT IMPREGNATED FISHING LURE

[76] Inventor: Eugene T. Larew, Shadrack Resort, Cape Fair, Mo. 65624

[21] Appl. No.: 296,427

[22] Filed: Aug. 26, 1981

[51] Int. Cl.³ .............................................. A01K 85/00
[52] U.S. Cl. .................... 43/42.06; 43/42.24; 43/42.28; 43/42.3
[58] Field of Search ............. 43/42, 42.06, 42.24, 43/42.26, 42.27, 42.28, 42.3

[56] References Cited

U.S. PATENT DOCUMENTS

| | | | |
|---|---|---|---|
| 2,563,522 | 8/1951 | Fisher | 43/42.24 |
| 2,874,048 | 2/1959 | Walldov | 43/42.06 |
| 2,979,778 | 4/1961 | Simons | 43/42.06 |
| 3,108,389 | 10/1963 | McGuire | 43/42.06 |
| 3,505,755 | 4/1970 | Pearce | 43/42.06 |
| 3,579,895 | 5/1971 | Orn | 43/42.06 |
| 3,846,931 | 11/1974 | Block | 43/42.24 |
| 3,854,234 | 12/1974 | Hardin | 43/42.06 |
| 4,050,181 | 9/1977 | Young et al. | 43/42.06 |
| 4,245,420 | 1/1981 | Carr | 43/42.06 |

OTHER PUBLICATIONS

Jerry Gibbs, Frog Rigs: Old and New Outdoor Life, Sep. 1981.

Primary Examiner—Nicholas P. Godici
Assistant Examiner—Kurt Rowan
Attorney, Agent, or Firm—Polster, Polster & Lucchesi

[57] ABSTRACT

A fishing lure includes a hook part and a body part, the body part being made of a vinyl plastisol having incorporated throughout the plastisol a sufficient quantity of salt (sodium chloride) to give the lure a salty taste.

20 Claims, 5 Drawing Figures

SALT IMPREGNATED FISHING LURE

BACKGROUND OF THE INVENTION

This invention relates to a fishing lure and in particular to a soft plastic lure which tends to be held longer by a fish than is a conventional lure.

Conventional fishing lures having soft plastic bodies are well known. Such lures are frequently formed as worms, frogs, lizards, small fish or the like. In addition to the body part, such lures include a hook part, comprising one or more hooks, and an attachment part for attaching the lure to a line. They may also include other parts, such as a trailer or a weed guard, and they may be parts of other lures, such as spinner baits. Such lures are believed to attract fish by a number of means, including for example primarily their visual resemblance to the animals which the fish consume, as well as their "flash" when moving through the water and the sound waves they produce when moving through the water. In some instances, such lures include an odorant which produces a scent to attract fish.

When such baits are taken by a fish, it is extremely important to set the hook quickly, because fish generally do not take the bait for any appreciable length of time.

SUMMARY OF THE INVENTION

One of the objects of this invention is to provide a fishing lure of the type including a soft plastic body which will be taken by a striking fish for a longer period of time than previously known lures, thereby increasing the chance to hook the fish before it rejects the bait.

Other objects will occur to those skilled in the art in light of the following description and accompanying drawings.

In accordance with this invention, generally stated, a fishing lure is provided which includes a body part and at least one hook part connected thereto, the body part being formed of a plastic material, the plastic material being impregnated with sufficient salt to impart a salty taste to the body part. Preferably, the salt is sodium chloride in a finely divided flake form, and is incorporated in the plastic material during the process of molding the body part. Preferably, the body part is in the form of a soft-bodied animal such as a worm, frog or lizard.

Preferably, the body is made of a resilient plastic, most preferably a vinyl chloride plastisol. The salt is incorporated into the plastisol while the plastisol is in a liquid state, the plastisol thereafter being heated to a gelation or fusion temperature to give it a desired resilience and strength. The terms "gelation" and "fusion" are necessarily somewhat arbitrarily applied in the plastisol art. The term "gelation" refers to the physical change which occurs as the resin is dispersed in the plasticizer. At some point during the heating cycle, swelling of the resin particles causes a loss of fluidity, and the plastisol develops a degree of film strength. At the point that the plastisol has certain properties, such as lack of tackiness or a particular tensile strength, gelation is said to occur. When mutual solution of plasticizer and resin occurs, after gelation has occurred, the plastisol is said to have reached fusion. The degree of fusion of a particular plastisol is dependent on the ultimate temperature reached. Complete fusion, which typically occurs at a temperature of from three hundred degrees to four hundred degrees Fahrenheit, is evidenced by maximum tensile strength and maximum clarity of the material.

The plastisol is formulated and heated according to known techniques for controlling the properties of plastisols, to give the lure body a desired degree of resilience and tensile strength.

As is known, in their simplest form vinyl plastisols consist of poly(vinyl chloride) dispersion grade resin dispersed in a permanent, high temperature solvent or plasticizer. The preferred resin used in the lures of the present invention is a dispersion grade polyvinyl chloride having a particle size on the order of one micron. The dispersion grade resin may be mixed in desired proportion (for example sixty/forty) with one or more vinyl blending resins. Usable vinyl resins are commercially available in a variety of compositions for homopolymer and copolymer formulations, in a variety of molecular weights and particle sizes, all in accordance with known plastisol technology.

Many different plasticizers may be used in the plastisols, and may be chosen in accordance with known criteria to provide proper physical properties, such as stiffness, permanence and sensitivity to temperature changes, processing characteristics such as gelation temperature and rate of fusion, and economics. Typical plasticizers are diester plasticizers such as dioctyl phthalate or other phthalate diesters based on alcohols having from six to eleven carbon atoms, adipate diesters based on alcohols having from six to ten carbon atoms, and azelate diesters based on alcohols having from six to ten carbon atoms. The plastisol comprises, per hundred parts vinyl resin, on the order of fifty to five hundred parts diester plasticizer. Secondary plasticizers (typically hydrocarbons) are frequently used as extenders, and the total plasticizer level in the plastisol may vary from one hundred to eight hundred parts per hundred parts of vinyl resin. In the preferred formulations for use in the present invention, the plasticizer is included at levels of from about two hundred to five hundred parts per hundred of the vinyl resin, all parts being by weight.

The plastisol of which the body of the present invention is made preferably includes stabilizers and pigments, also in accordance with well-known plastisol technology. The stabilizers are most frequently combinations of metallic salts, such as various organic salts of barium, cadmium and zinc, epoxies, such as epoxidized soybean oil and epoxidized tallate esters, and phosphites. The stabilizer is preferably included in an amount of from one to ten parts per hundred of the resin, most preferably from three to five parts per hundred. Fillers such as calcium carbonate may also be included in the formulation, but are not presently preferred.

The salt is preferably finely divided sodium chloride, such as American Salt Company's "Flour Salt". Preferably the salt is present in an amount equal to about one pound per five to twenty gallons of plastisol (approximately one half to three percent by weight). Most preferably, the salt is present in an amount equal to on the order of one pound per twelve gallons of plastisol (approximately one percent by weight).

The process of manufacturing the lure includes mixing the ingredients of the plastisol in the usual manner, with the addition of the salt to the formula. The salt is mixed thoroughly with the plastisol to assure that it is distributed throughout the liquid plastisol. A controlled amount of the plastisol is then placed in molds for molding by known techniques such as slush molding or rotational molding. In the molding process, the plastisol is heated to its gelation temperature, typically on the order of about 200°–400° F. while it is being molded, and is removed from the mold when it has achieved the desired physical properties.

DESCRIPTION OF THE PREFERRED EMBODIMENT

Figure 1:
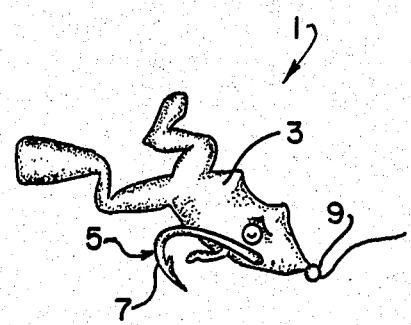
FIG. 1 is a view in perspective of one illustrative embodiment of fishing lure of the present invention.

Referring now to the drawings, and in particular to FIG. 1, reference numeral 1 indicates a lure of the present invention. The lure 1 includes a body part 3 formed as a small frog and a hook part 5, partially embedded in the body part 3. The hook part 5 includes a barbed hook end 7 which extends out through the side of the body part 3 and an eye end 9 which extends through the forward end of the body 3, for attachment to the leader of a fishing line. The lure 1 is conventional except for the material of which the body 3 is made, and thus in the manner of making the lure.

The lure is manufactured by making up a liquid plastisol of the following formula, all parts being by weight:

Polyvinyl chloride, dispersion grade: 100
Plasticizer (dioctyl phthalate): 350
Secondary plasticizer (hydrocarbon): 18
Stabilizer (metal, phosphite type): 3
Pigment: 5

The liquid plastisol is mixed well and to the mixture is added five parts by weight of sodium chloride (flour salt), with mixing. The mixture is then placed in molds with the hook part 5 extending through the mold, and the plastisol is cured to a gelation or fusion temperature sufficient to provide a lure having a strong, resilient lure body. A temperature on the order of about two-hundred-fifty degrees Fahrenheit is believed to be adequate, although the heating cycle is determined more by physical characteristics of the plastisol than by absolute temperature. When cooled, the lure body has a salty taste. When submerged in water, the lure does not exude salt, and therefore retains its taste indefinitely. It has been found that the lure is taken by fish, such as bass, for a longer period than a similar lure made without salt. Therefore, the number of fish actually taken with the lure of the present invention is greater than with a conventional lure.

Figure 2:
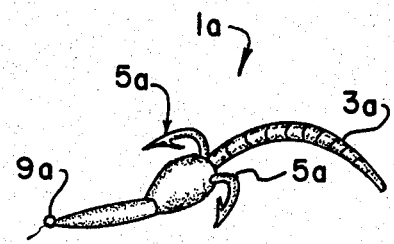
FIG. 2 is a view in perspective of another illustrative embodiment of lure of the present invention.
Figure 3:
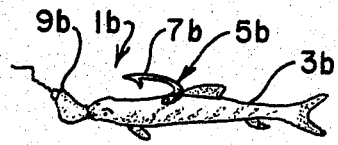
FIG. 3 is a view in perspective of another illustrative embodiment of lure of the present invention.
Figure 4:
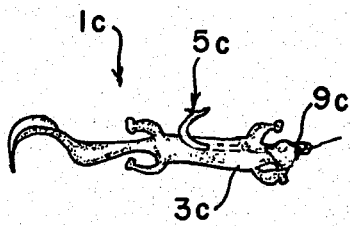
FIG. 4 is a view in perspective of another illustrative embodiment of lure of the present invention.

The particular form of the lure, both as to the body part and as to the rest of the lure, is by no means limited to that illustrated. As shown in FIG. 2, for example, the lure may be in the form of a standard plastic worm, having a multi-pointed hook, or as shown in FIGS. 3 and 4, the body part may be formed as a minnow or lizard having a jighead hook part.

Figure 5:
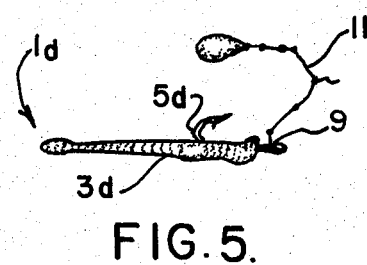
FIG. 5 is a view in perspective of another illustrative embodiment of lure of the present invention.

As shown in FIG. 5, the body may also be formed separate from the hook part, and the hook part inserted into the body. In this embodiment, the head of the hook part is attached to the wire harness 11 of a spinner belt.

Numerous variations in the lure of the present invention, within the scope of the appended claims, will occur to those skilled in the art in light of the foregoing disclosure. Merely by way of example, it will be appreciated that in those embodiments having a long, thin body part, the body part could be attached between the head and the tip of the hook, in a standard weedless rigging. Standard skirts or other trailers may be added to the lures. The lures may possibly be scented, although it is preferred that they not be scented, and it is believed that the addition of scent may tend to mask the salty taste of the lure. The amount of salt may be varied within the limits set by the minimum required to give the body a salty taste and the maximum allowed by the physical properties of the plastisol. The body may be sold separately and the hook inserted by the user. These variations are merely illustrative.

I claim:

1. In a fishing lure comprising a body part and at least one hook part connected thereto, the improvement wherein said body part is formed of a plastisol of a resin dispersed in an organic solvent, said plastisol being impregnated with sufficient salt to impart a salty taste to said body part.

2. The improvement of claim 1 wherein said body part is in the form of a soft-bodied animal.

3. The improvement of claim 2 wherein said plastisol is substantially free of organic fish attractant.

4. The improvement of claim 3 wherein said body is formed as a worm, frog or lizard.

5. The improvement of claim 3 wherein said plastisol is a vinyl chloride plastisol.

6. The improvement of claim 1 wherein said salt is incorporated into said plastisol while said plastisol is in a liquid state, said plastisol thereafter being heated to a gelation temperature sufficient to form a resilient body.

7. The improvement of claim 6 wherein said salt is present in an amount equal to about one pound per 5 to 20 gallons of plastisol.

8. The improvement of claim 5 wherein said plastisol comprises on the order of 100 parts vinyl resin and 50 to 500 parts diester plasticizer.

9. The improvement of claim 8 wherein said plastisol further comprises 0–40 parts hydrocarbon secondary plasticizer and 1–10 parts stabilizer.

10. The improvement of claim 8 wherein said salt is present in an amount equal to about one pound per 5 to 20 gallons of plastic material.

11. A body for a fishing lure in the form of a soft-bodied animal, said body being formed of a plastisol of a resin dispersed in an organic solvent, said plastisol being impregnated with sufficient salt to impart a salty taste to said body part.

12. The improvement of claim 11 wherein said plastisol is substantially free of organic fish attractant.

13. The improvement of claim 12 wherein said body is formed as a worm, frog or lizard.

14. The improvement of claim 12 wherein said plastisol is a vinyl chloride plastisol.

15. The improvement of claim 14 wherein said salt is incorporated into said plastisol while said plastisol is in a liquid state, said plastisol thereafter being heated to a gelation temperature sufficient to form a resilient body.

16. The improvement of claim 15 wherein said salt is present in an amount equal to about one pound per 5 to 20 gallons of plastisol.

17. The improvement of claim 14 wherein said plastisol comprise on the order of 100 parts vinyl resin and 50 to 500 parts diester plasticizer.

18. The improvement of claim 17 wherein said plastisol further comprises 0-40 parts hydrocarbon secondary plasticizer and 1-10 parts stabilizer.

19. The improvement of claim 17 wherein said salt is present in an amount equal to about one pound per 5 to 20 gallons of plastic material.

20. A body for a fishing lure in the form of a soft-bodied worm, frog or lizard, said body being formed of a resilient plastic material impregnated with sufficient salt to impart a salty taste to said body part, said plastic material being substantially free of organic fish attractant.

* * * * *